United States Patent
Boucaux et al.

(10) Patent No.: US 9,770,861 B2
(45) Date of Patent: Sep. 26, 2017

(54) METHOD OF MANUFACTURING FUEL TANKS BY BLOW MOULDING

(71) Applicant: INERGY AUTOMOTIVE SYSTEMS RESEARCH (SOCIETE ANONYME), Brussels (BE)

(72) Inventors: Eric Boucaux, Elincourt Sainte Marguerite (FR); Seiji Kosako, Yokohama (JP)

(73) Assignee: INERGY AUTOMOTIVE SYSTEMS RESEARCH (SOCIETE ANONYME), Brussels (BE)

( * ) Notice: Subject to any disclaimer, the term of this patent is extended or adjusted under 35 U.S.C. 154(b) by 109 days.

(21) Appl. No.: 14/648,498

(22) PCT Filed: Dec. 2, 2013

(86) PCT No.: PCT/FR2013/052912
§ 371 (c)(1),
(2) Date: May 29, 2015

(87) PCT Pub. No.: WO2014/083293
PCT Pub. Date: Jun. 5, 2014

(65) Prior Publication Data
US 2015/0314516 A1    Nov. 5, 2015

(30) Foreign Application Priority Data
Nov. 30, 2012   (FR) ..................................... 12 61502

(51) Int. Cl.
*B29C 49/28*    (2006.01)
*B29C 49/48*    (2006.01)
(Continued)

(52) U.S. Cl.
CPC .............. *B29C 49/28* (2013.01); *B29C 49/04* (2013.01); *B29C 49/18* (2013.01); *B29C 49/22* (2013.01);
(Continued)

(58) Field of Classification Search
None
See application file for complete search history.

(56) References Cited

U.S. PATENT DOCUMENTS 5,993,721 A  *  11/1999  Kurihara  .................  B29C 49/20
                                                        264/40.1
7,600,652 B1    10/2009  Johansen
(Continued)

FOREIGN PATENT DOCUMENTS

FR        1.491.546       8/1967
JP        55-154133 A     12/1980

OTHER PUBLICATIONS

International Search Report issued Feb. 5, 2014, in PCT/FR2013/052912, filed Dec. 2, 2013.
(Continued)

*Primary Examiner* — Monica Huson
(74) *Attorney, Agent, or Firm* — Oblon, McClelland, Maier & Neustadt, L.L.P.

(57) ABSTRACT

A method of manufacturing fuel tanks made of polymer material using a blow molding technique, the method including: offering up at least one sheet form extrudate between two opposing cavities of an open mold with an impression that corresponds to a shape of a tank that is to manufactured; then bringing the two cavities together until the mold is closed; as the two cavities are being moved closer together and before the extrudate comes into contact with one of them, injecting a first fluid between the extrudate and at least one cavity; injecting a second fluid on the
(Continued)

opposite side of the extrudate from each cavity, to press it firmly against the wall of the cavity; removing the first fluid present between the cavity and the extrudate before end of injection of the second fluid.

10 Claims, 3 Drawing Sheets

(51) Int. Cl.
*B29C 49/58* (2006.01)
*B29C 49/62* (2006.01)
*B65D 1/00* (2006.01)
*B29C 49/04* (2006.01)
*B29C 49/18* (2006.01)
*B29C 49/22* (2006.01)
*B29L 31/00* (2006.01)

(52) U.S. Cl.
CPC .............. *B29C 49/48* (2013.01); *B29C 49/58* (2013.01); *B29C 49/62* (2013.01); *B65D 1/00* (2013.01); *B29L 2031/7172* (2013.01)

(56) References Cited

U.S. PATENT DOCUMENTS

2004/0129708 A1 7/2004 Borchert et al.
2008/0006625 A1 1/2008 Borchert et al.

OTHER PUBLICATIONS

French Preliminary Search Report and Written Opinion issued Aug. 13, 2013, in Patent Application No. FR 1261502, filed Nov. 30, 2012 (with English Translation of Category of Cited Documents).

* cited by examiner

METHOD OF MANUFACTURING FUEL TANKS BY BLOW MOULDING

The present invention relates to the technical field of blow molding for the manufacture of plastic fuel tanks.

Numerous techniques for the manufacture of fuel tanks are known. For example, the applicant company has already developed a technique involving manufacturing a tank from a parison.

One particular problem that may arise with the known techniques lies in the fact that the dimensions and highly complex shapes of tanks make it difficult to form the extrudate in the mold by blow molding without certain parts of the extrudate stretching excessively in the most unevenly shaped points of the mold.

Now, this stretching of material may lead to localized thinning of the wall of the tank. The permeability and/or strength of the tank may therefore become impaired. In general, it is desirable to have a tank with the most uniform possible wall thickness.

It is an object of the invention to propose a method of manufacturing a plastic fuel tank from at least one sheet-form extrudate, characterized in that it consists in:
 offering up the sheet-form extrudate between two opposing cavities of an open mold, the imprint of which corresponds to the shape of the tank that is to be manufactured, then
 bringing the two cavities closer together until the mold is closed,
 while the two cavities are being brought closer together, injecting a first fluid on the side of the extrudate, which side is situated between the extrudate and the cavity, injecting a second fluid on the other side of the extrudate, removing the first fluid present between the cavity and the extrudate before the end of injection of the second fluid so as to press the extrudate firmly against the cavity.

In one particular embodiment, the first fluid is injected before the extrudate comes into contact with one of the cavities, or at least before various parts of the extrudate that are to be preserved from excessive stretching come into contact with one of the cavities.

By injecting the first fluid between the extrudate and at least one of the cavities, a circulation of this first fluid is created at the surface of one wall of the cavity. This circulation of fluid makes it possible to create a cushion of fluid at least at certain points between said wall and the extrudate. Such a cushion of fluid has the function of preventing the extrudate from coming into direct contact with the wall.

A cushion of fluid according to the invention can therefore control the stretching, which means to say provide control over the precise moment at which the extrudate comes into contact with the wall. As a result, a uniform extrudate thickness and therefore uniform fuel tank wall thickness can be obtained.

What is meant in the present description by an extrudate in sheet form is both a slab of plastic, which means to say one that generally has a shape having two long dimensions and a thickness that is very small in comparison with these long dimensions, give or take any folds, or a tubular parison of any cross section, preferably closed. In the latter case, one particular embodiment of the invention is to preblow the parison before the two cavities of the mold are brought closer together, so as to give the parison a certain shape.

What is meant by removing the fluid is, in the present description, the fact of:

placing the medium containing this fluid in fluidic communication with the outside of the mold, and
 creating a pressure differential between these two media.
  This pressure differential may be obtained by suction from outside the mold or simply by venting to atmospheric pressure, given the pressure obtaining inside the mold as a result of the blowing of the parison.

Plastic means any thermoplastic polymer including thermoplastic elastomers, and blends thereof. The term "polymer" means both homopolymers and copolymers (notably binary or ternary ones). Examples of such copolymers are, nonlimitingly: copolymers with random distribution, sequence copolymers, block copolymers and grafted copolymers.

Any type of thermoplastic copolymer or polymer having a melting point below the decomposition temperature will suit. Synthetic thermoplastics that have a melting range spread over at least 10 degrees Celsius are particularly well suited. By way of example of such materials, there are those that exhibit polydispersion of their molecular mass.

In particular, use may be made of polyolefins, thermoplastic polyesters, polyketones, polyamides and copolymers thereof. A blend of polymers or of copolymers may also be used, as may a blend of polymers with inorganic, organic and/or natural fillers such as, for example, although nonlimitingly: carbon, salts and other inorganic derivatives, natural or polymer fibers. It is also possible to use multilayer structures made up of layers that are stacked and attached comprising at least one of the polymers or copolymers described above.

One polymer that is often used is polyethylene. Excellent results have been obtained with high density polyethylene (PEHD).

According to the invention, the extrudate may be a sheet having a structure resulting from the stacking of several layers of different polymer compositions. A layer often used to advantage in such a structure is a layer comprising at least one material that forms a barrier to liquids and gases, particularly to hydrocarbons.

The invention offers the advantage of avoiding any loss of homogeneity of such a stack of layers of different materials that make up the wall of the tank. There is therefore no need to increase the tank wall thickness everywhere in order that at the most stretched points the stack of layers forming the hydrocarbons barrier will maintain its full effectiveness.

By virtue of the invention, the cushion of fluid present between the extrudate and the wall of the cavity prevents the extrudate from sticking to the wall and accordingly allows it to slide without friction parallel to this wall. Because it is not bonded to the wall, the extrudate can be pulled out over its entire length uniformly to cover the corresponding surface of the wall of the cavity. The thickness of the extrudate can thus remain homogeneous at all points on the mold and the stack of layers creating the barrier to hydrocarbons maintains its homogeneity and effectiveness.

As a result of this, it is possible, by virtue of the invention, to manufacture a fuel tank of which the thickness, which therefore varies very little from one point on the tank to another, is very close to the required minimum thickness. The required thickness is generally fixed by the motor vehicle manufacturer according to norm-based or standardized strength or resistance, notably fire resistance, criteria. A required minimum thickness of 2.5 mm is, for example, commonplace.

Advantageously, the first fluid is air or a mixture of air with another fluid.

According to one particular embodiment, the first fluid is injected at certain points in the mold according to the geometry thereof. For example, for a mold of parallelepipedal overall geometry, notably with faces that are planar overall, the cushion of fluid is created in the central part of the overall planar faces. For preference, what is meant by the central part is that part of the face that lies at a distance exceeding one third of the dimension of the face in any direction considered passing through the middle of said face.

According to one particular embodiment, the difference in pressure between the second fluid and the first fluid is between 1 bar and 2 bar, preferably 1.5 bar.

According to one particular embodiment, the injection points and the conditions of injection for the first fluid are distributed according to the zones that need to be protected from a risk of excessive stretching of the parison. In particular, the first fluid may be injected between the extrudate and the cavity at at least two different temperatures, at at least two different points of the mold. Likewise, the second fluid may be injected between the extrudate and the cavity at at least two different times.

In one particular embodiment, the points of injection of the first fluid are provided with means that allow the fluid to pass but that prevent the material of which the extrudate is made from flowing. In one advantageous alternative form of this embodiment, at least one of the means that allow the fluid to pass but prevent the material of which the extrudate is made from flowing comprises a directional nozzle allowing a jet of the first fluid to be directed toward a specific location of the mold.

According to one particular embodiment, the second fluid is injected on the opposite side of the extrudate to each cavity before the first fluid is removed. In this way, the stretching of the extrudate is optimized given that it is allowed to conform as closely and accurately as possible to the wall of the cavity under the effect of the pressurized fluid before the extrudate is allowed to stick to the cavity at the very last minute, when the fluid of the pressurized fluid is removed.

In one particular embodiment, the parison is pre-blown before the two cavities of the mold are brought closer together, so as to give the parison a certain shape.

By way of example, the method according to the invention may run over a 60-second cycle and the step of injecting the second fluid on the opposite side of the extrudate to each cavity begins between 2 and 6 seconds after the moment the mold starts to close.

Another subject of the invention is a mold for manufacturing fuel tanks of polymer material by implementing the method described hereinabove. Such a mold is characterized by the presence of orifices that allow the first fluid to be injected between the extrudate and the cavity, each orifice being connected to a pipe for the circulation of the first fluid.

Another subject of the invention is a fuel tank obtained by implementing the method described hereinabove.

The invention will be better understood from reading the attached figures which are given by way of nonlimiting example, in which.

Figure 1:
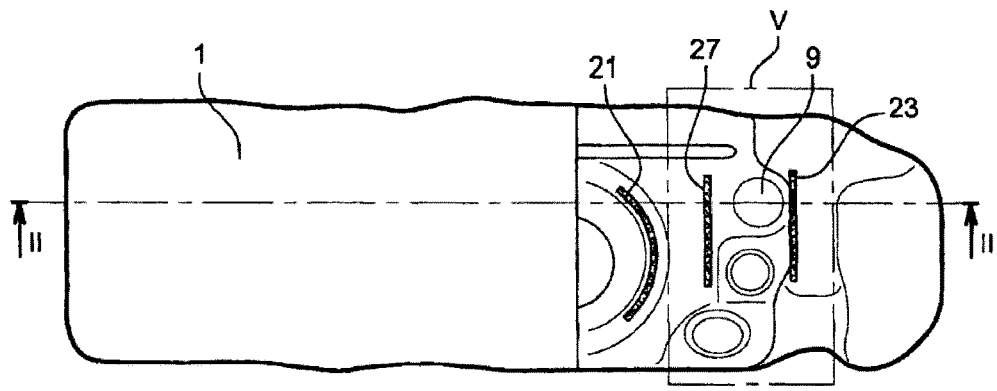
FIG. 1 is an elevation of a fuel tank made of polymers obtained by blow molding.

FIG. 1 shows a fuel tank 1 made of polymers, in this instance high density polyethylene, of a motor vehicle. This tank has a capacity of 50 liters. Its overall dimensions are around 140 cm long, around 40 cm wide and around 40 cm tall.

This tank has been obtained by blow molding an extrudate in the form of a tubular parison in a blow-molding mold. The parison is itself obtained by extrusion just prior to blowing. It therefore constitutes an extrudate in sheet form, preferably a multilayer containing layers that form a barrier against hydrocarbons. The parison will be denoted indifferently by the terms parison and extrudate, given the way in which it is obtained. The invention would also be suited to the use of extrudates in the form of open tubes or even of slabs. One or more sheets may be blow-molded simultaneously in the mold, being welded together during the blow-molding or after the blow-molding.

According to the known method of blow-molding, the extrudate is offered up between two opposing cavities of an open mold. These two cavities, when the mold is closed again, form the impression of an entire tank.

To shape the parison, a fluid is injected under pressure on the opposite side of the extrudate to each cavity, in order to press it firmly against the wall of said cavity.

The material of which the extrudate is made stretches and follows the shape of the mold, then, as it cools on contact with the wall of each cavity, sets and maintains this shape (give or take shrinkage) to form the wall 3 of the tank.

Figure 2:
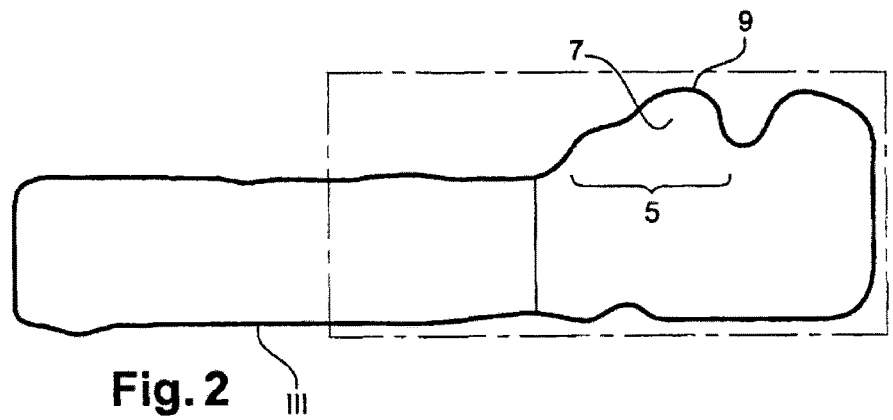
FIG. 2 is a section on II-II of the tank of FIG. 1.

In FIG. 2 it may be seen that the cross section of the mold of FIG. 1 is very uneven. In particular, a zone 5 intended to house tank internal equipment comprises, at the top of a relief 7, a disk-shaped plateau 9 intended then to be cut out in order to form a seat for penetrating equipment (such as a valve, not depicted).

Figure 3:
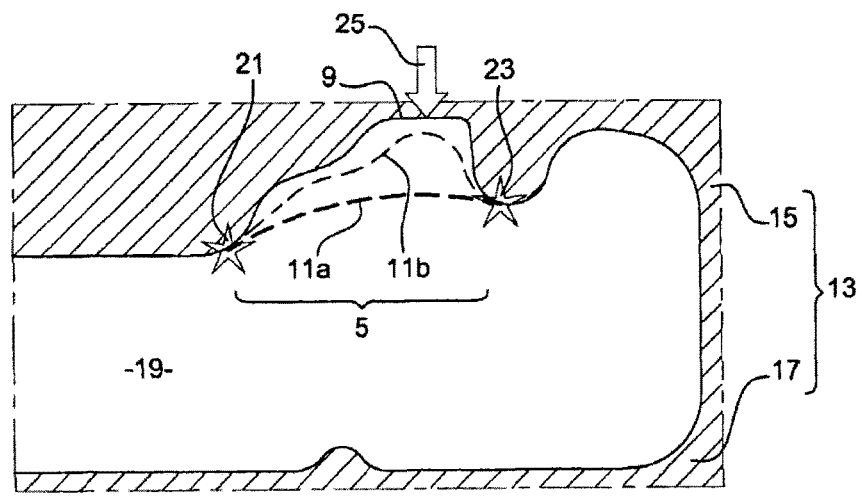
FIG. 3 depicts a portion of a blow-molding mold corresponding to the part III of the mold of FIG. 2 and a portion of a parison in the process of being blow-molded in this mold.

FIG. 3 depicts a portion of the parison used to manufacture the mold of FIGS. 1 and 2 using a blow-molding mold 13 with two cavities 15 and 17, the impression 19 of which exactly delimits the tank that is to be obtained. This parison is depicted in FIG. 3 at two different times in the blow-molding, using broken lines 11*a* and 11*b*.

In the first position 11*a*, the parison has begun to swell, under the effect of the injection of fluid under pressure, hereinabove referred to as "second fluid" on its opposite side to the cavity 15. As it swells it begins to come into contact with the wall of the cavity 15 along two lines of contact 21 and 23 indicated schematically by stars which, at this point in the mold, are salient parts of the mold impression.

As may be seen in FIG. 1 where they are depicted in heavy line, the lines of contact 21 and 23 are circular and rectilinear respectively.

These first contacts have the effect of cooling the parison around these two lines 21 and 23 and of sticking it to the wall of the cavity in the vicinity of these two lines.

The parison therefore remains free between these two lines of contact 21 and 23 but finds itself constrained by its available length between these two lines in order to conform to the specific shape of the zone 5 of the cavity 15.

In the invention there is created a circulation of fluid, hereinabove denoted "first fluid", which in the example described consists of air, at the surface of the wall of the cavity 15, in the zone 5, by virtue of a vent indicated schematically by an arrow 25. The vent 25 is a conventional model, used in blow-molding molds to release the air trapped between the parison and the mold. One example of such vents is given in FIG. 7.

According to the invention, the first fluid may be air or any other gas or liquid or a mixture of one or more gases and of one or more liquids.

The circulation of air creates, between the parison and the wall of the cavity in the zone 5, a cushion of air which prevents said parison from coming into contact with said wall. Thus, as depicted by the later position 11b, the parison conforms to the specific shape of the zone 5 without sticking to any other salient part of this zone.

In other words, the circulation of air creates a cushion of air between the wall of the cavity 15 and the extrudate in order to prevent direct contact of the extrudate with the wall at the location of the cushion of air.

As a result, the stretching of the parison is uniform between the two lines of contact 21 and 23 and no excessive reduction in thickness need be feared at certain points of the parison.

After a certain time, which may be ten seconds or so and generally is comprised between a few seconds and twenty seconds or so, while air continues to be injected under pressure into the parison in order to make it conform to the mold 13, the injection of air through the vent 25 is halted (or even air is sucked out through the vent 25 with a view to accelerating its removal) to cause the air present between the parison and the wall of the cavity to be removed. Now that the cushion of air has disappeared, the parison then sticks to the wall of the zone 5 of the cavity at all points thereof, but without having experienced excessively localized stretching.

Figure 4:
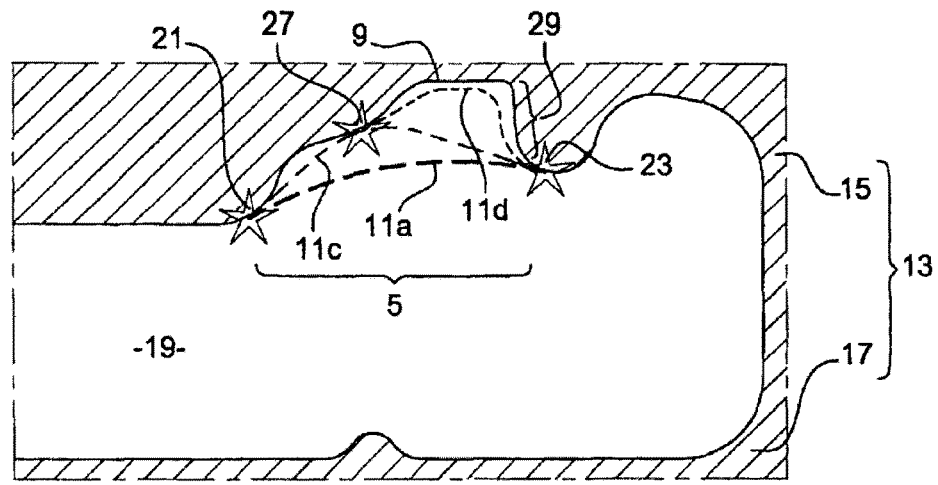
FIG. 4 is a view similar to that of FIG. 3 illustrating how the parison behaves when a method of the prior art is implemented.

FIG. 4 illustrates what is meant by excessively localized stretching.

This figure depicts the same blow-molding method except that no air cushion is created between the parison and the wall of the cavity 15. It is therefore a blow-molding method according to the prior art.

It can be seen that having stuck to the two lines of contact 21 and 23, the parison, indicated schematically as a broken line 11c, enters the zone 5 and sticks again to a salient part, along a line of contact 27 (see also FIG. 1). As it gradually continues to swell under the effect of the pressurized air injected for blow-molding, the parison gradually sticks to the wall of the cavity starting from the line of contact 27 and proceeding toward the disk 9, leaving itself with an increasingly small surface for stretching starting from the position indicated schematically by the broken line 11d. Stretching is at a maximum in the zone 29 between the disk 9 the line of contact 23, which corresponds to the part of the parison that is last to come into contact with the wall of the cavity 15.

Figure 5:
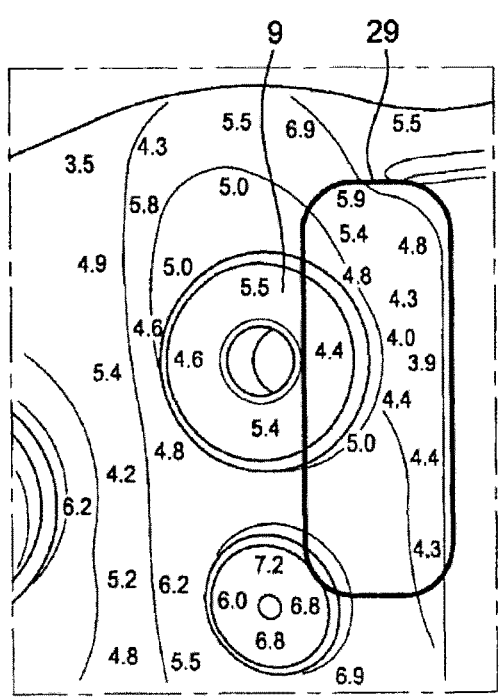
FIG. 5 is a depiction of a part V of the tank of FIG. 1 obtained by implementing the method according to the invention.
Figure 6:
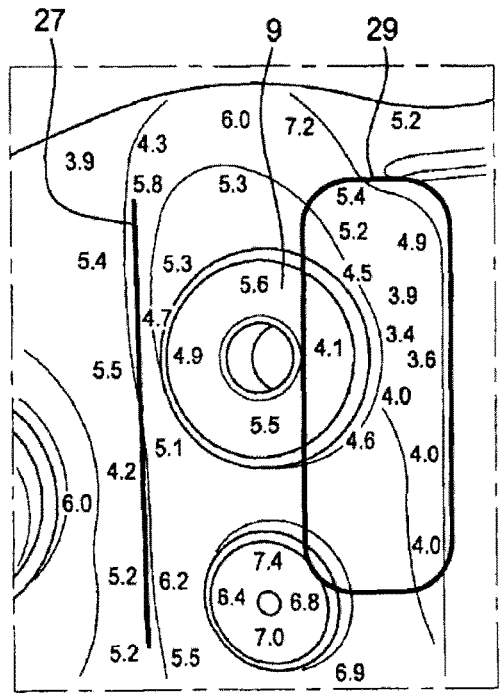
FIG. 6 is a depiction similar to that of FIG. 5 of a tank obtained by implementing a method according to the prior art.

The result of excessive stretching of the parison is quantified using the measurements given in FIGS. 5 and 6, in which the part V of the tank (see FIG. 1) may be seen. At each zone where a measurement has been taken, the tank wall thickness has been recovered.

FIG. 5 shows the tank obtained according to the invention, whereas FIG. 6 shows a tank obtained according to the method of the prior art.

The most characteristic measures recorded are summarized in the following table.

| Region | FIG. 5 | FIG. 6 |
| --- | --- | --- |
| Line 27 | 4.6; 4.8; 5.0 | 4.7; 5.1; 5.3 |
| Disk 9 | 4.4; 4.6; 5.4; 5.5 | 4.1; 4.9; 5.5; 5.6 |
| Zone 29 | 3.9; 4.0; 4.4 | 3.6; 3.4; 4.1 |

The units used are mm.

It is clearly evident that, in zone 5 and more especially in the regions of the disk 9 and of the zone 29, the thickness of the parison is reduced far less by implementing the method according to the invention.

Figure 9:
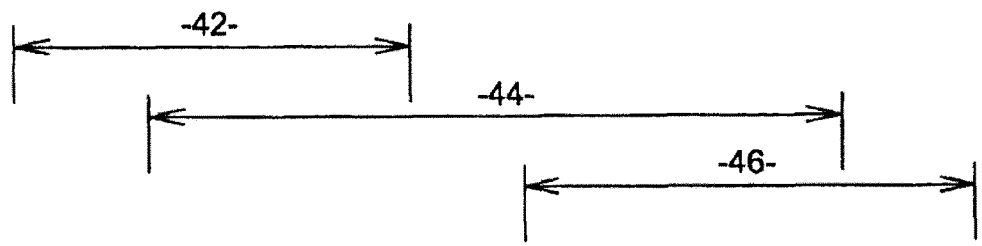
FIG. 9 is a graph with respect to time showing the sequencing of the successive steps carried out when implementing a method described by way of example.

The sequence of steps illustrated by the graph of FIG. 9 shows that the phase 42 of bringing the two cavities 15 and 17 of the mold closer together begins before the phase 44 of injecting air ("first fluid") through the vents.

Once the two cavities are in the final molding position, the moving-together step 42 ends and the cushion of air is maintained between the extrudate and the cavity or cavities of the mold by maintaining the injection of air ("first fluid") during step 44.

The injection of the second fluid, for blow-molding the extrudate in the mold, begins with a step 46 which starts before the end of the step 44 of injecting air ("first fluid") and either before the start of this step 44 or during the latter. If it is preferable to pre-blow the extrudate in order to give it some volume before or during the moving-together of the two cavities 15 and 17 of the mold then the step 46 may have started before the start of the step 44.

According to the invention, the step 44 of injecting air ("first fluid") ends after the start of the step 46 of injecting the blow-molding fluid ("second fluid"), so that the firm pressing of the extrudate against the walls of the cavities caused by the blowing is controlled by the cushion of air. The end of step 44 of injecting air may consist of simply stopping the injection of air or of sucking air out through the vents.

The invention therefore makes it possible to maintain better wall quality for the tank without the need to use an excessively thick parison. This results in a saving on material and a saving of weight.

It is therefore clear that the stretching is better distributed over the entire surface of the parison that has benefited from the cushion of air.

Figure 7:
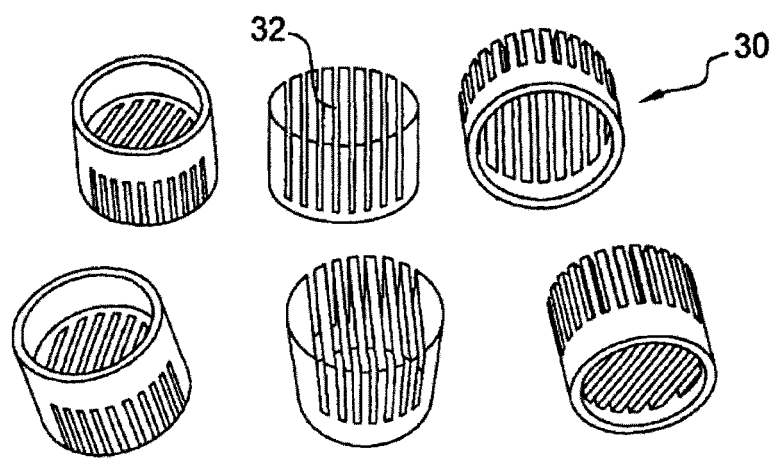
FIG. 7 is a depiction of conventional vents used in blow-molding molds.

The vents 30 visible in FIG. 7 are conventional vents having slots 32 that are narrow enough to allow air to pass while at the same time preventing the material of which the extrudate is made from flowing through them.

Figure 8:
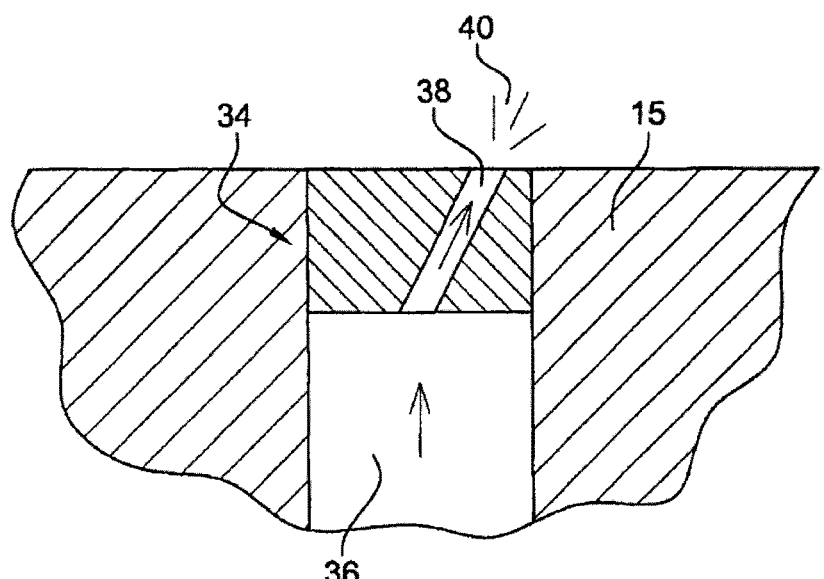
FIG. 8 is a diagram in section of a directional vent that can be used in the invention.

FIG. 8 shows a directional vent 34 in position in the wall of the cavity 15 of the mold, inside an air passage canal 36. It may be seen that the directional vent has a small canal 38 which, on the one hand, opens into the air passage canal 36 and, on the other hand, opens into the mold.

The air injected into the canal 36 enters the small canal 38 whence it reemerges inside the mold in the form of a jet 40.

Such a directional vent 34 allows air to be sent into the mold at a precise location in order to prevent premature contact of the extrudate with the wall of the cavity. Depending on the powerfulness of the air jet, it may be contemplated for the vent or vents to be positioned relatively distant from the locations of the cavity in which it is desirable to create an air cushion.

The invention is not restricted to the embodiments set out and other embodiments will become clearly apparent to those skilled in the art.

The invention claimed is:

1. A method of manufacturing a plastic fuel tank from at least one sheet-form extrudate, comprising:
    offering up an extrudate between two opposing cavities of an open mold, an imprint of which corresponds to a shape of the tank that is to be manufactured; then
    bringing the two cavities closer together until the mold is closed;
    while the two cavities are being brought closer together, injecting a first fluid on a first side of the extrudate, which first side is situated between the extrudate and at least one cavity;
    injecting a second fluid on a second side of the extrudate;
    removing the first fluid present between the cavity and the extrudate before an end of injection of the second fluid to press the extrudate firmly against the cavity, the removing the first fluid including applying a suction from outside the mold or venting to atmospheric pressure.

2. The method as claimed in claim 1, wherein the extrudate includes two sheets each including a slab of plastic.

3. The method as claimed in claim 1, wherein the extrudate includes a tube including a plastic parison of any cross section.

4. The method as claimed in claim 3, wherein the parison is pre-blown before the two cavities of the mold are brought closer together, to give the parison a certain shape.

5. The method as claimed in claim 1, wherein the first fluid is injected between the extrudate and the cavity under at least one of the following injection conditions:
    at least two different temperatures;
    at least two different times;
    at least two different locations of the mold.

6. The method as claimed in claim 1, wherein at least one of the cavities includes means allowing the fluid to pass but preventing a material of which the extrudate is made from flowing.

7. The method as claimed in claim 6, wherein at least one of the means allowing the fluid to pass but preventing a material of which the extrudate is made from flowing includes a directional nozzle allowing a jet of the first fluid to be directed toward a precise location in the mold.

8. The method as claimed in claim 1, wherein the second fluid is injected on the second side of the extrudate before the first fluid is removed.

9. A mold for manufacturing a plastic fuel tank by implementing the method as claimed in claim 1, including presence of orifices that allow the first fluid to be injected between the extrudate and the cavity, each orifice being connected to a pipe for the circulation of the first fluid.

10. The method as claimed in claim 3, wherein the plastic parison has a closed cross section.

* * * * *